United States Patent
Baughman et al.

(10) Patent No.: US 11,461,231 B2
(45) Date of Patent: Oct. 4, 2022

(54) FRACTAL BASED CONTENT DELIVERY NETWORK LAYOUTS

(71) Applicant: INTERNATIONAL BUSINESS MACHINES CORPORATION, Armonk, NY (US)

(72) Inventors: Aaron K. Baughman, Cary, NC (US); Mauro Marzorati, Lutz, FL (US); Shikhar Kwatra, Durham, NC (US); Andrew Ladd Wismar, Wake, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 86 days.

(21) Appl. No.: 16/657,282

(22) Filed: Oct. 18, 2019

(65) Prior Publication Data
US 2021/0117322 A1 Apr. 22, 2021

(51) Int. Cl.
*G06F 12/00* (2006.01)
*G06F 12/0802* (2016.01)

(52) U.S. Cl.
CPC ...... *G06F 12/0802* (2013.01); *G06F 2212/60* (2013.01)

(58) Field of Classification Search
CPC ............. G06F 12/0802; G06F 2212/60; G06F 3/0655; G06F 3/0604; G06F 3/067
See application file for complete search history.

(56) References Cited

U.S. PATENT DOCUMENTS

| 9,660,876 | B2 | 5/2017 | Lipstone et al. |
| 10,057,609 | B2 | 8/2018 | Rieger et al. |
| 10,154,074 | B1 | 12/2018 | Stoica et al. |
| 2005/0198274 | A1* | 9/2005 | Day ...................... H04L 63/123 709/224 |

(Continued)

FOREIGN PATENT DOCUMENTS

| CN | 103404193 A | 11/2013 |
| CN | 103620576 A | 3/2014 |

OTHER PUBLICATIONS

Monika, "Particle Swarm Optimization based Hierarchical Agglomerative Clustering for Software Modularization", Thesis Document, Dr. B.R Ambedkar NIT, 2015, 68 pages.

(Continued)

*Primary Examiner* — Craig S Goldschmidt
(74) *Attorney, Agent, or Firm* — Rakesh Roy; Andrew D. Wright; Roberts Calderon Safran & Cole, P.C.

(57) ABSTRACT

A computer-implemented method includes: measuring, by a computer device, a current value of an operating parameter of an origin server in an existing content delivery network (CDN) having a number of other servers, the other servers being servers other than the origin; determining, by the computer device, that the current value of the operating parameter is outside of an acceptable range for the operating parameter; measuring, by the computer device, a time to live (TTL) of data caches on a plurality of the other servers of the existing CDN; and determining, by the computer device and based on the measuring of the TTL, an alteration to a configuration of the other servers in the existing CDN that changes the current value of the operating parameter to a value inside the acceptable range.

19 Claims, 9 Drawing Sheets

(56) References Cited

U.S. PATENT DOCUMENTS

| | | | |
|---|---|---|---|
| 2007/0118667 A1* | 5/2007 | McCarthy | H04L 45/74 709/238 |
| 2013/0166680 A1* | 6/2013 | Long | H04L 67/2857 709/217 |
| 2014/0068043 A1* | 3/2014 | Archbold | H04L 61/1511 709/223 |
| 2017/0118496 A1 | 4/2017 | Redmond | |
| 2017/0264968 A1* | 9/2017 | Mao | H04N 21/23106 |
| 2020/0053155 A1* | 2/2020 | Shi | G06N 3/088 |

OTHER PUBLICATIONS

Parunak et al., "Dynamic Decenlralized Any-Time Hierarchical Clustering", International Workshop on Engineering Self-Organising Applications, pp. 66-81, 2006, 8 pages.

Mell et al., "The NIST Definition of Cloud Computing", NIST, Special Publication 800-145, Sep. 2011, 7 pages.

* cited by examiner

FRACTAL BASED CONTENT DELIVERY NETWORK LAYOUTS

BACKGROUND

Aspects of the present invention relate generally to modification of content delivery networks and, more particularly, to splicing processor nodes into or out of an existing content delivery network.

A content delivery network or content distribution network (CDN) is a geographically distributed network of proxy servers (edges and midgresses) and their data centers (origins). A goal of CDNs is to provide high availability and high performance by distributing the service spatially relative to end-users. CDNs serve a large portion of the Internet content today, including web objects (text, graphics and scripts), downloadable objects (media files, software, documents), applications (e-commerce, portals), live streaming media, on-demand streaming media, and social media sites.

CDN is an umbrella term spanning different types of content delivery services: video streaming, software downloads, web and mobile content acceleration, licensed/managed CDN, transparent caching, services to measure CDN performance and load balancing, multi CDN switching and analytics, and cloud intelligence.

CDNs augment the end-to-end transport network by distributing on it a variety of intelligent applications employing techniques designed to optimize content delivery. Web caches store popular content on servers that have the greatest demand for the content requested. Web caches are populated based on requests from users (pull caching) or based on preloaded content disseminated from content servers (push caching).

SUMMARY

In a first aspect of the invention, there is a computer-implemented method including: measuring, by a computer device, a current value of an operating parameter of an origin server in an existing content delivery network (CDN) having a number of other servers, the other servers being servers other than the origin; determining, by the computer device, that the current value of the operating parameter is outside of an acceptable range for the operating parameter; measuring, by the computer device, a time to live (TTL) of data caches on a plurality of the other servers of the existing CDN; and determining, by the computer device and based on the measuring of the TTL, an alteration to a configuration of the other servers in the existing CDN that changes the current value of the operating parameter to a value inside the acceptable range.

In another aspect of the invention, there is a computer program product including a computer readable storage medium having program instructions embodied therewith. The program instructions are executable by a computing device to cause the computing device to: measure a current value of an operating parameter of an origin server in an existing content delivery network (CDN) having a number of other servers, the other servers being servers other than the origin; determine that the current value of the operating parameter is outside of an acceptable range for the operating parameter; measure a time to live (TTL) of data caches on a plurality of the other servers of the existing CDN; and determine, based on the measuring of the TTL, that a second CDN is to be agglomerated into the existing CDN to change the current value of the operating parameter to a value inside the acceptable range. The second CDN includes the origin.

In another aspect of the invention, there is system including a processor, a computer readable memory, and a computer readable storage medium. The system includes program instructions to: measure a current value of an operating parameter of an origin server in an existing content delivery network (CDN) having a number of other servers, the other servers being servers other than the origin; to determine that the current value of the operating parameter is outside of an acceptable range for the operating parameter; to measure a time to live (TTL) of data caches on a plurality of the other servers of the existing CDN; and to determine, based on the measuring of the TTL, an alteration to a configuration of the other servers in the existing CDN that changes the current value of the operating parameter to a value inside the acceptable range. The program instructions are stored on the computer readable storage medium for execution by the processor via the computer readable memory.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
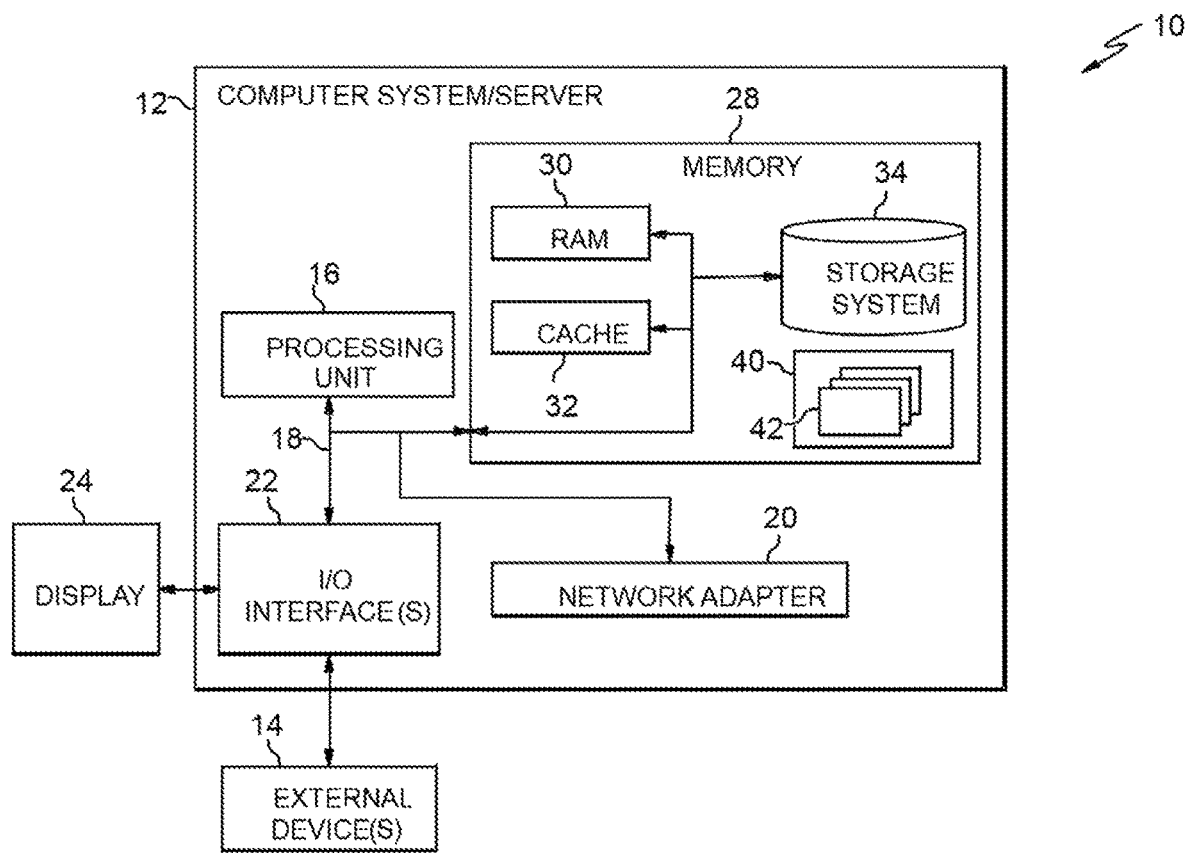
FIG. 1 depicts a cloud computing node according to an embodiment of the present invention.

Aspects of the present invention relate generally to modification of content delivery networks and, more particularly, to splicing processor nodes into or out of an existing content delivery network. According to aspects of the invention an existing CDN including an origin server is modified to incorporate a second CDN that includes the same origin server in order to improve the hit:cache ratio of the origin server. In embodiments, the modification is automatically performed and repeated to periodically update the configuration of the existing CDN to automatically and repeatedly monitor and improve the hit:cache ratio of the origin server. In this manner, implementations of the invention reduce download times for data that originates on the origin server while also maintaining the hit:cache ratio of the origin server in an acceptable range.

Implementations of the invention include features that are not well-understood, routine, or conventional activity in the relevant art. For example, determining, based on measuring of the TTL, that a configuration of servers in an existing CDN should be altered to change the current value of a hit:cache ratio of an origin server to a value inside the acceptable range is not well-understood, routine, or conventional. In addition, implementations of the invention are an improvement to the technological field of CDNs in that an origin server is protected from over use while still maintaining a desired performance of the CDN.

Embodiments of the invention include a method for ensuring data freshness in a multiple-CDN (Content Delivery Network) environment. An exemplary method includes, for a group of CDNs that each rely on the same origin data, analyzing historical traffic information (e.g. hit:cache ratio) to build a model that will predict future changes in the origin data, and in response to a predicted upcoming change to a specific data element of the origin data, dynamically modifying CDN parameters (e.g. TTL) for each CDN of the group prior to the predicted time of the predicted upcoming change.

As described above, web caches are populated based on requests from users (pull caching) or based on preloaded content disseminated from content servers (push caching). Request routing directs client requests to the content source best able to serve the request. In embodiments, this involves directing a client request to the service node of the CDN that is closest (geographically or time-wise) to the client, or to the service node with the most capacity. In layered configurations, the web cache may itself be a client and thus the routing strategy becomes a recursion problem and thus why an approach for optimization by using fractal theory's self-similitude properties is suitable.

Stratification of servers in a CDN is desirable because each layer further dampens the impact of traffic spikes. However, each stratum creates challenges. For example, adding layers in a CDN reduces hit:cache ratios but increases overall latency. Each layer can be thought of as having a certain dimension in two-dimensional space (a smaller number of powerful computing devices or a higher number of less powerful devices). Therefore, it is desirable to arrive at the optimum number of layers composed of appropriately sized "particles" to achieve the best results for the conditions at hand. An optimum number of layers balances increasing latency with increasing protection of the origin (decreasing the hit:cache ratio). In embodiments, the hit:cache ratio is the ratio of the number of times the origin is hit with a request (a "hit") to the total number of requests (to both the origin and all other servers). In embodiments, it is desirable to increase the number of requests served by edge servers (edges) of the CDN so that the origin is protected from over use.

In CDNs that deliver services to a highly variable user base, such as in a fantasy football league, the time of day and day of the week influence the overall demand level, and the type of content itself is variable within the intra-season cycles. In such CDNs, embodiments of the invention provide network performance improvement by reconfiguring the connections between nodes of the CDN.

Swarming is a collective behavior exhibited by entities, particularly animals, of similar size which aggregate together, perhaps milling about the same spot or perhaps moving en masse or migrating in some direction. Swarming is a highly interdisciplinary topic. Studying the principles of collective animal behavior has relevance to human engineering problems through the philosophy of biomimetics.

Some systems exhibiting Swarming Intelligence include a population of simple agents interacting locally with one another and with their environment. Ant colonies exhibit swarming behavior and react to alarm conditions via multi component signals. These alarm conditions are classified as alarm-attack (to draw additional fighters to the stimulus) or panic-alarm (to flee or retreat from the stimulus) and are communicated via simple pheromonal messages that translate roughly to "engage", "more", etc. based on chemical concentration of the specific pheromone. Embodiments of the invention incorporate swarming and biomimetics principles in that embodiments compare parameters of processing like types of data to decide potential grouping of servers within a CDN.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
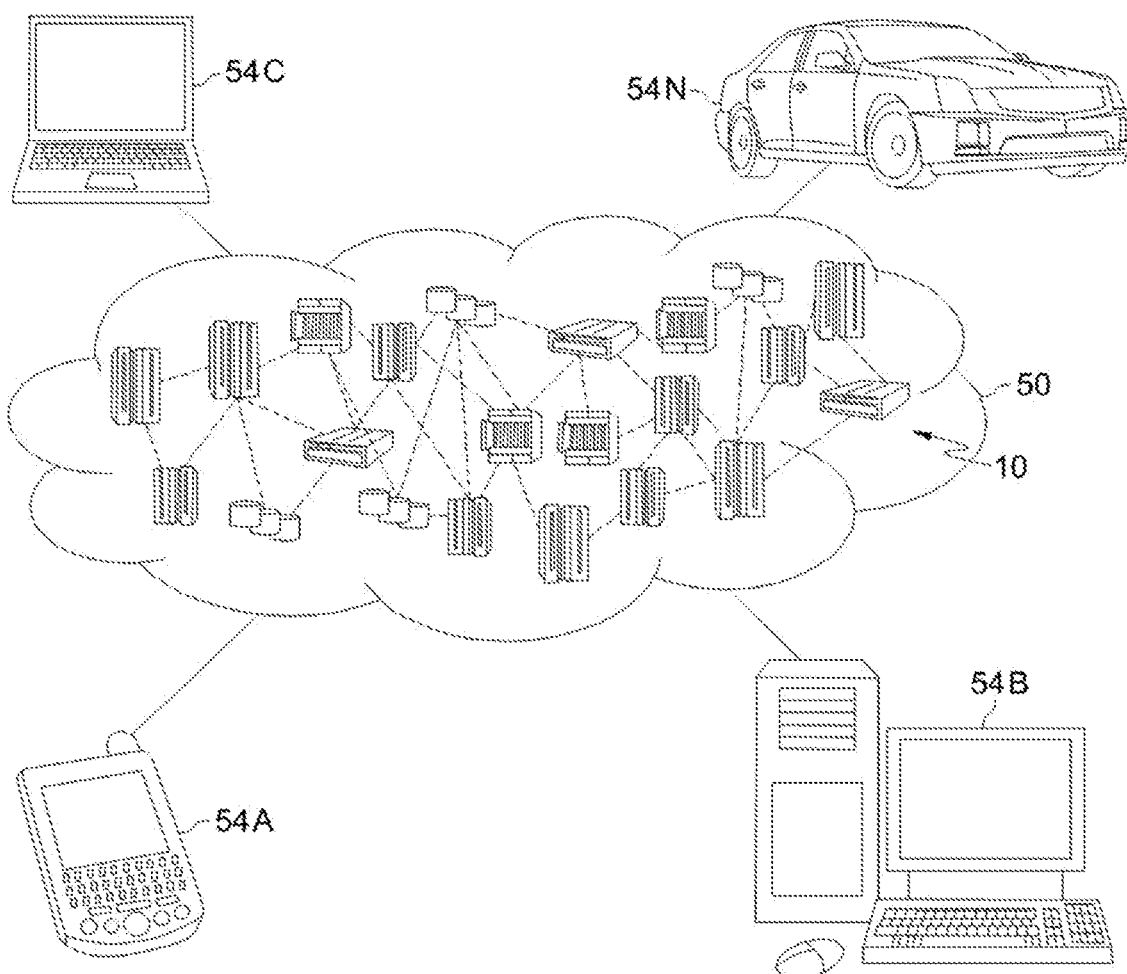
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
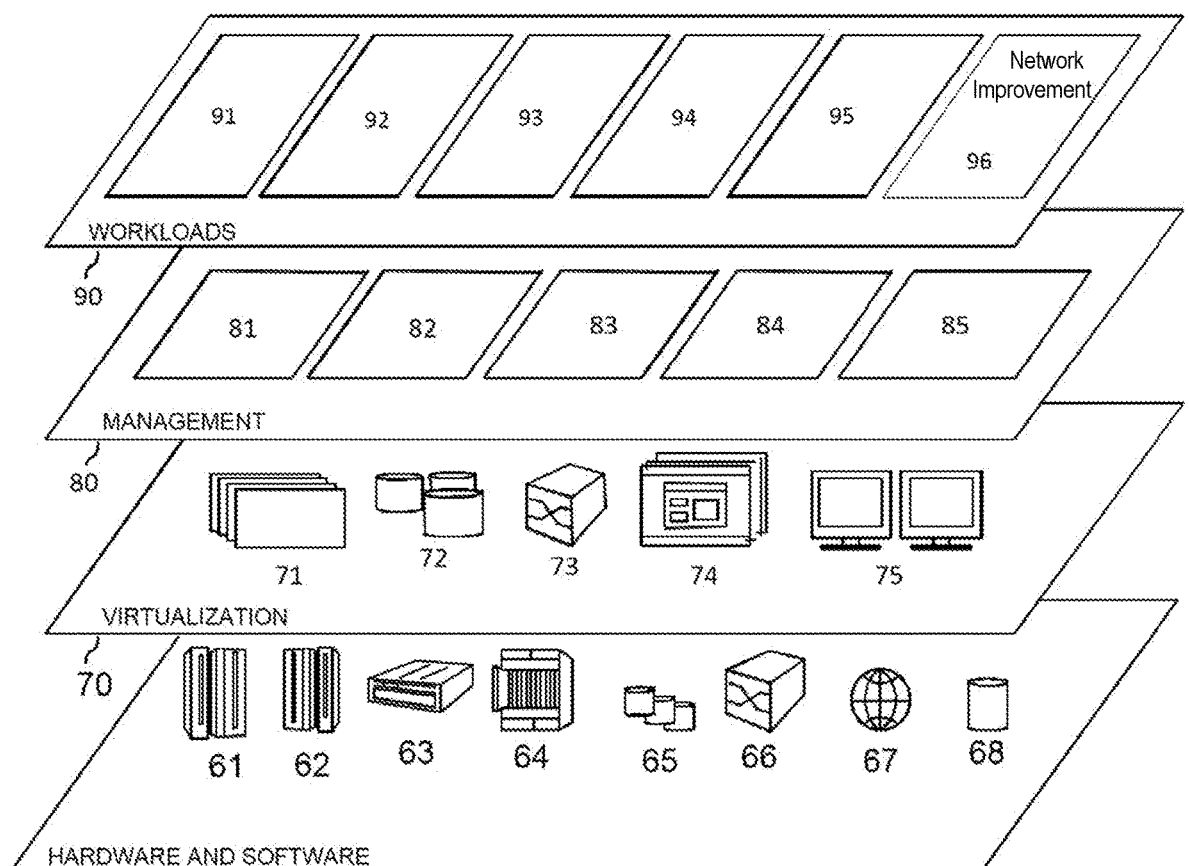
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network improvement 96.

Implementations of the invention may include a computer system/server 12 of FIG. 1 in which one or more of the program modules 42 are configured to perform (or cause the computer system/server 12 to perform) one of more functions of the network improvement 96 of FIG. 3. For example, the one or more of the program modules 42 may be configured to: measure a current value of an operating parameter of an origin server in an existing content delivery network (CDN) having a number of other servers, the other servers being servers other than the origin; determine that the current value of the operating parameter is outside of an acceptable range for the operating parameter; measure a time to live (TTL) of data caches on a plurality of the other servers of the existing CDN; and determine, based on the measuring of the TTL, that a configuration of the other servers in the existing CDN should be altered to change the current value of the operating parameter to a value inside the acceptable range.

To the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Embodiments use an agglomerative clustering algorithm that allows CDNs to react to external stimulus (either planned or unplanned) such as the disappearance of an origin, or as a reaction to compute utilization resources at the origin data center via simple more/less control messaging sometimes used in distributed intelligence organizations (e.g., swarms). Embodiments use algorithms that maintain a variable within a desired range (such as used in heating/ventilating/air conditioning thermostats) to indicate the need for CDN resources.

Embodiments select a control algorithm to measure the appropriate level of demand placed on an origin server (or set of servers). The origin server (or servers) is where the data being accessed originates. The algorithm ascertains values of current operating parameter(s) and, based on those values, requests either: (1) more CDN resources (for example, servers) be marshalled; or (2) CDN resources be released back to a resource pool. Embodiments use an agglomerative clustering algorithm to calculate an appropriate place to splice in or splice out processor nodes from multiple CDNs to form one CDN. In embodiments, a divisive algorithm is used as another form of a hierarchical clustering mechanism instead of agglomerative clustering.

Embodiments include: an autonomic self-healing mechanism via agglomerative (and/or divisive) clustering; autonomic splicing of additional CDNs to an existing CDN; optimal stratification of CDN layers based on content behavior changes over time; and/or layer stratification via monitored response over time.

Embodiments, through hybrid usage of multiple CDN's, reduce reliance on any single distribution provider. The rapid growth of the demand for streaming video traffic requires large capital expenditures by broadband providers in order to meet this demand and to retain subscribers by delivering a sufficiently good quality of experience. To address this, telecommunications service providers (TSPs) have begun to launch their own content delivery networks as a means to lessen the demands on the network backbone and to reduce infrastructure investments.

Figure 4:
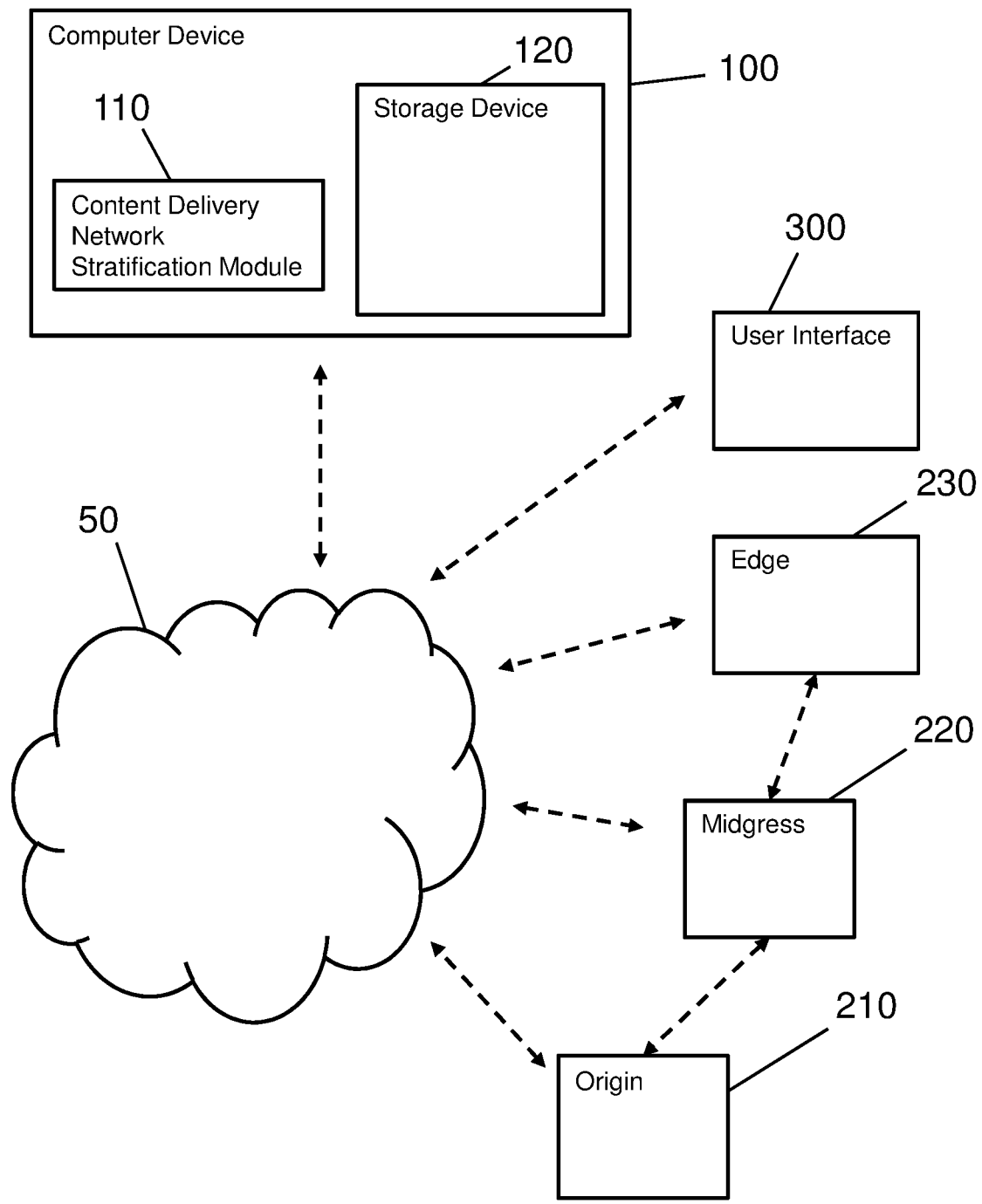
FIG. 4 shows a block diagram of an exemplary environment in accordance with aspects of the invention.

FIG. 4 shows a block diagram of an exemplary environment in accordance with aspects of the invention. In embodiments, the environment includes a computer device 100 such as, for example, computer system/server 12 in FIG. 1, that communicates over one or more networks such as, for example cloud computing environment 50. In this example, computer device 100 includes a content delivery network (CDN) stratification module 110, for example, one or more of program modules 42 in FIG. 1, and a storage device 120 such as, for example, storage system 34 in FIG. 1.

FIG. 4 shows an origin 210 such as, for example, desktop computer 54B in FIG. 2 or some other computer or computer server, that communicates with computer device 100 over, for example, cloud computing environment 50. In embodiments, origin 210 is a computer server on which data originates. In embodiments, origin 210 exists outside of cloud computing environment 50. In other embodiments, origin 210 is part of cloud computing environment 50. FIG. 4 shows a midgress 220 that is a computer server that communicates with origin 210 and which caches a portion of the data originating on origin 210. FIG. 4 shows an edge 230 that is a computer server that communicates with midgress 220 and which caches a portion of the data originating on origin 210. In this example, origin 210, midgress 220, and edge 230 are all accessible by computer device 100 through cloud computing environment 50. In embodiments, origin 210, midgress 220, and edge 230 are all accessible by computer device 100 through a network other than cloud computing environment 50.

FIG. 4 shows a user interface 300 such as, for example, desktop computer 54B in FIG. 2, that is used by a user to access the data that originates on origin 210. In this example, user interface 300 accesses the data (that originates on origin 210) that resides on origin 210, midgress 220, and/or edge 230 through cloud computing environment 50. In other embodiments, user interface 300 accesses the data (that originates on origin 210) that resides on origin 210, midgress 220, and/or edge 230 through a network other than cloud computing environment 50.

In the example shown in FIG. 4, origin 210, midgress 220, and edge 230 represent a CDN such as, for example, the CDNs discussed above. Although only one origin 210, one midgress 220, and one edge 230 are shown in FIG. 4, it is understood that embodiments include multiple origins 210, multiple midgresses 220, and/or multiple edges 230. In embodiments, user interface 300 communicates with origin 210 to access the data that originates on, and is stored on, origin 210. In embodiments, user interface 300 communicates with midgress 220 to access the data that originates on origin 210 and is cached on midgress 220. In embodiments, user interface 300 communicates with edge 230 to access the data that originates on origin 210 and is cached on edge 230. In embodiments, accessing data on origin 210 provides a fast data transfer (due to an absence of routing through layers of the CDN, but can overload origin 210. Accessing the data from a cache on midgress 220 or edge 230 reduces the load on origin 210 and, in some cases, provides a faster data transfer (even with the added layer or layers) because midgress 220 or edge 230 is geographically closer to user interface 300. The impact of the above factors is measured by embodiments of the invention by measuring a parameter such as, for example, time to live (TTL) of the cache on the various midgresses 220 and edges 230. The TTL of a particular cache of data on a particular midgress 220 or edge 230 is the time for which that data is cached on that particular midgress 220 or edge 230 before the cache is erased.

Figure 5:
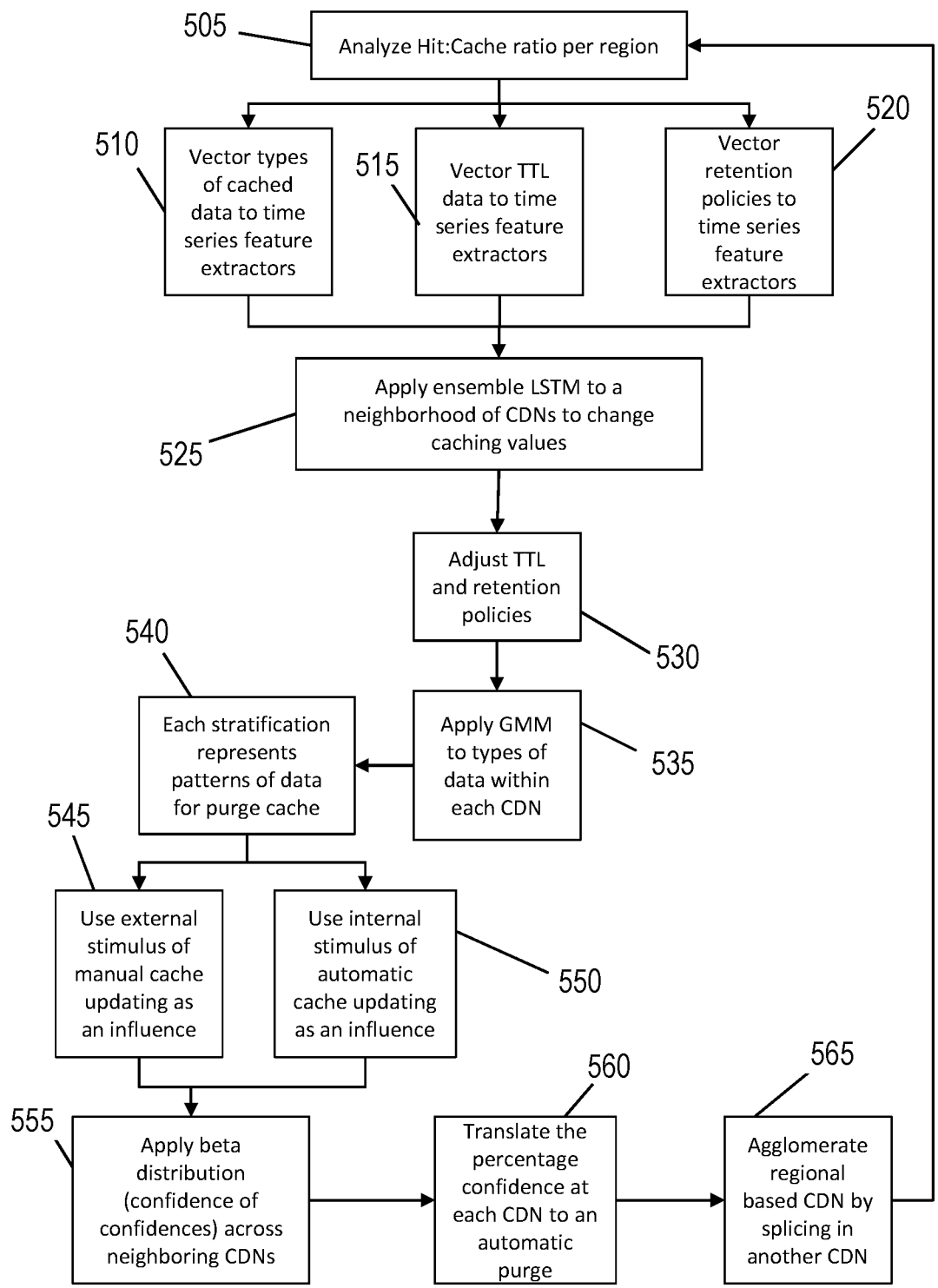
FIG. 5 shows an exemplary flow chart in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 505, the system analyzes a hit:cache ratio for each regional CDN, for example, the hit:cache ratio described above. For example, in embodiments, content delivery network stratification module 110 analyzes each of several regional based CDNs, such as, for example, a CDN including origin 210, midgress 220, and edge 230 of FIG. 4, based on the hit:cache ratio and response types for top requests (as measured by origin resource utilization, for example). Examples of requests include video streams, software downloads, webpage access, etc. Examples of response types include immediately available, delayed availability, partial availability, data not available, etc. In embodiments, the analysis of step 505 reveals edges between CDNs that show a weak point within a multi CDN topology, or an origin outage. For example, in embodiments, another CDN is attached to edge 230 in FIG. 4 so that a data path passes through edge 230, and the analysis of step 505 reveals that edge 230 is a weak point of data transfer that results in a slow transmission of data.

At steps 510, 515, and 520 content delivery network stratification module 110 extracts features of the data at each node (such as data cached at edge 230, data cached at midgress 220, and data originating at origin 210) of the CDNs and represents the features as feature vectors. At step 510, the data type of the data is represented as a feature vector. At step 515, the TTL of the data is represented as a feature vector. At step 520, retention policies of the data are represented as a feature vector.

At step 525, the system applies an ensemble long short-term memory (LSTM) to a neighborhood of CDNs to change cache values. In other embodiments, some other form of recurrent neural network (other than LSTM) is used in step 525. At step 525, content delivery network stratification module 110 processes the features of the data, in feature vector form (from steps 510, 515, 520), using the LSTM to determine if another CDN should be combined with the neighborhood of CDNs to improve the performance of the neighborhood of CDNs. Based on the results from processing the feature vectors, content delivery network stratification module 110 identifies, within the neighborhood, CDN's with too many error responses (for example, a duration for providing the requested data that is longer than a threshold) or insufficient origin resources as a connection point for congruent CDN's with identical origins (discussed in more detail below with reference to FIGS. 8-10).

At step 530, in embodiments, the system adjusts TTL and retention polies for nodes that show performance parameters outside of acceptable ranges. For example, in embodiments, content delivery network stratification module 110 adjusts a TTL policy in midgress 220 or edge 210 of FIG. 4 based on the application of LSTM in step 525 so that an access time of a request is reduced so that it falls below a predetermined threshold.

Figure 6:
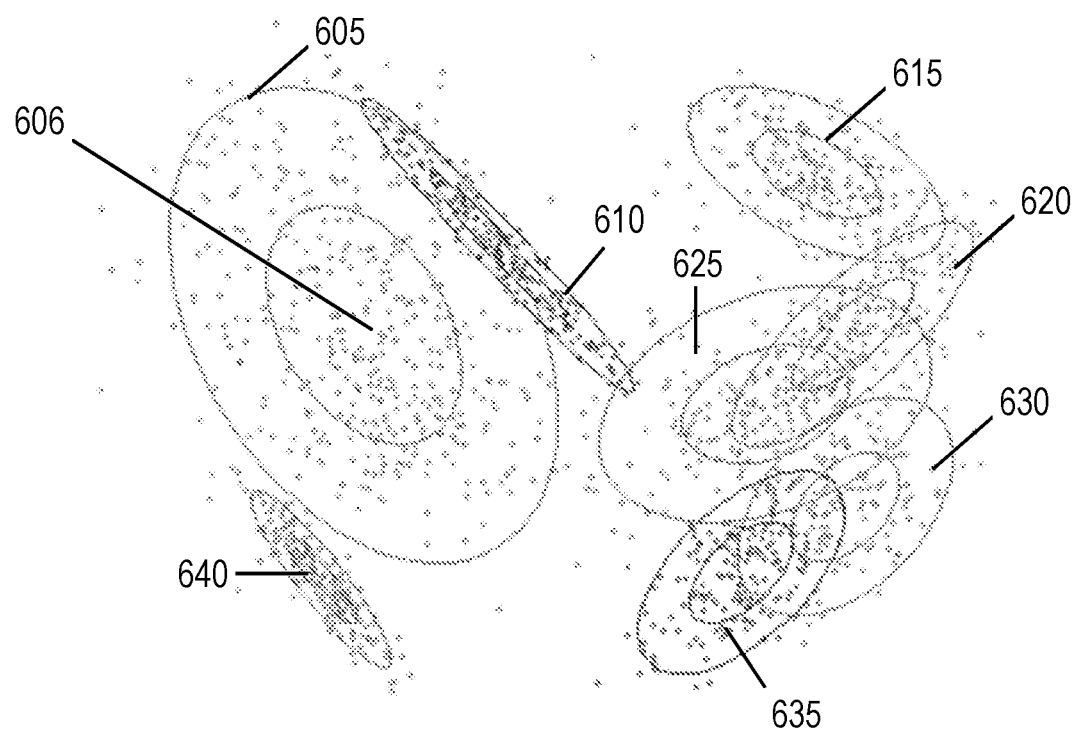
FIG. 6 shows an exemplary Gaussian mixture model in accordance with aspects of the invention.

At step 535, in embodiments, the system applies a Gaussian mixture model (GMM) to TTL information for different data types to determine a target TTL for each data type. GMM is just one example of a mixture model that is used by embodiments to determine target TTLs. For example, content delivery network stratification module 110 applies a GMM as shown in FIG. 6 to the various types of data within each CDN in the neighborhood of CDNs.

At step 540, the system recognizes patterns of cache purging for each layer/stratum of the CDN. A layer/stratum of a CDN is a group of nodes that are the same number of links away from the origin (discussed in more detail below with reference to FIGS. 8-10). FIG. 6 shows an example of a GMM applied to a CDN that includes eight different types of data. In this example, the TTLs of each type of data are shows as a cluster of points represented by a pair of concentric ovals where each of the points in FIG. 6 represent a TTL of a request for that particular data type in a particular node. For example, cluster 605 includes TTLs for requests for text data; cluster 610 includes TTLs for requests for bitmap data; cluster 615 includes TTLs for requests for mp3 data; cluster 620 includes TTLs for requests for mp4 data; cluster 625 includes TTLs for requests for jpg data; and clusters 630, 635, and 640 include TTLs for requests for three other types of data.

In embodiments, content delivery network stratification module 110 selects the epicenter of each cluster (shown in FIG. 6) as a candidate TTL for the data type of that cluster. For example, content delivery network stratification module 110 selects epicenter 606 of cluster 605 as a candidate (target) TTL for the text data represented by cluster 605. In one example, the target TTL is five minutes, meaning that text data is held in cache is purged after the data goes unrequested for five minutes. Purging of the cache frees up server resources for other data caching. Content delivery network stratification module 110 improves the performance of each CDN, and the neighborhood of CDNs, by determining an optimal number of layers (strata) for each data type and then adding one or more CDNs to, or removing one or more CDNs from, the CDN neighborhood to provide the optimal number of layers in the CDN neighborhood for that data type (see step 565, below).

At step 545, the system tests the effect on system performance (for example, the speed in which request are fulfilled) of manually purging data from one or more nodes in the CDN (overriding the TTL of that node). For example, an administrator, through content delivery network stratification module 110, manually purges a cache of text data in midgress 220 and then observes any changes to system performance. If a manually purge increases the performance of the system, then the administrator can conclude that the TTL of that node for text data is not optimally set (for example, the duration of the TTL is too long). As a result, in embodiments, the administrator then, through content delivery network stratification module 110, changes the TTL of that node for text data.

At step 550, the system tests the effect on system performance (for example, the speed in which request are fulfilled) of automatically purging data from one or more nodes in the CDN (allowing the TTL of that node to operate normally). For example, content delivery network stratification module 110 automatically purges a cache of text data in midgress 220 and then the administrator observes any changes to system performance. If an automatic purge increases the performance of the system, then the administrator can conclude that the TTL of that node for text data is set at a good setting. As a result, in embodiments, the administrator then, would not change the TTL of that node for text data.

At step 555, in embodiments, the system applies beta distribution across neighboring CDNs for each type of data to determine a confidence of the confidence of the current TTL value used in a particular node. For example, content delivery network stratification module 110 determines from the GMM at step 535 that the confidence of the target TTL being optimal is 90 percent for a first node (for example edge 230 in FIG. 4) in the neighborhood of CDNs. In embodiments, this confidence percentage is derived from the number of manual purges in step 545 versus the number of automatic purges in step 550 for the first node. Further, in this example, content delivery network stratification module 110 also determines from the GMM at step 535 that the confidence of the target TTL being optimal is 85 percent for a neighboring node in the neighborhood of CDNs. In embodiments, this confidence percentage is derived from the number of manual purges in step 545 versus the number of automatic purges in step 550 for the neighboring node. The content delivery network stratification module 110 compares the confidence percentages of the first node and the neighboring node and calculates a factor that is then multiplied (in step 560) by the TTL of the lower percentage node (in this case, the neighboring node) to establish a new TTL for purging the lower percentage node.

At step 565, the system agglomerates a regional based CDN by splicing one CDN in to another CDN. For example, content delivery network stratification module 110 determines that the performance of a first CDN will be improved by splicing another CDN into the first CDN because doing so will optimize stratification in order to provide the desired balance between protecting the origin and providing fast data delivery. In embodiments, the content delivery network stratification module 110 determines that splicing another CDN in to the first CDN will improve performance if the hit:cache ratio of the first CDN is above a threshold. Content delivery network stratification module 110 determines the location of the splicing by testing different locations and determining the impact on the hit:cache ratio.

After step 565, processing continues to step 505, where the processes is repeated to determine if further adjusting of TTLs is desired. For example, content delivery network stratification module 110 reanalyzes the hit-cache ratio for each regional CDN.

Figure 7:
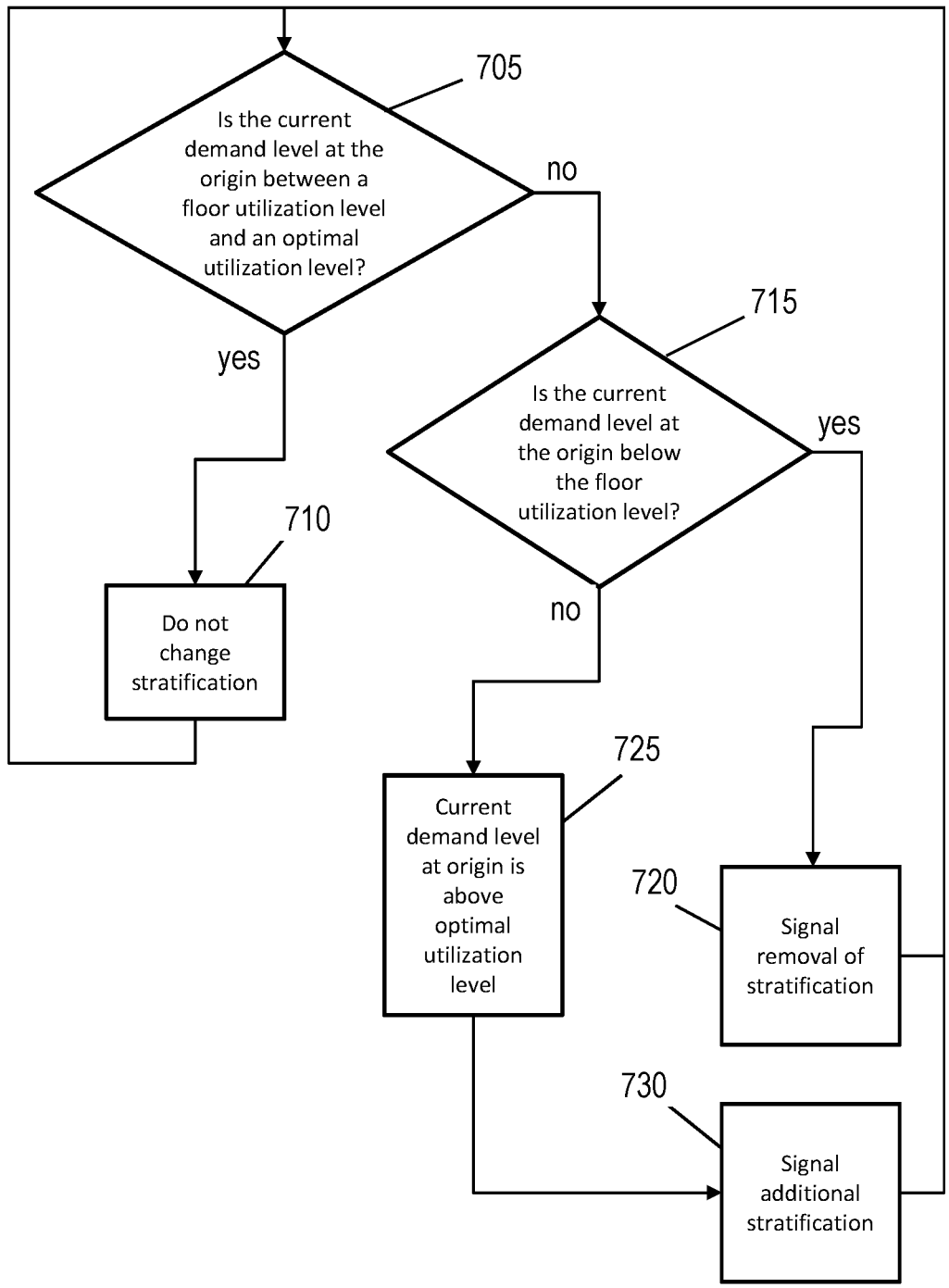
FIG. 7 shows an exemplary flow chart in accordance with aspects of the invention.

FIG. 7 shows a flowchart of an exemplary method in accordance with aspects of the present invention. Steps of the method may be carried out in the environment of FIG. 4 and are described with reference to elements depicted in FIG. 4.

At step 705, the system determines whether the current demand level at an origin is between a floor utilization level and an optimal utilization level. In embodiments, and as described with respect to FIG. 4, content delivery network stratification module 110 determines if the current demand level at origin 210 is between a floor utilization level and an optimal utilization level.

If, at step 705, the system determines that the current demand level at the origin is between a floor utilization level and an optimal utilization level, then processing continues to step 710 where the system does not change the stratification of the CDN. In embodiments, and as described with respect to FIG. 4, content delivery network stratification module 110 does not add or remove nodes, such as edge 230 from the CDN that includes origin 210, midgress 220, and edge 230.

If, at step 705, the system determines that the current demand level at the origin is not between a floor utilization level and an optimal utilization level, then processing continues to step 715 where the system determines whether the current demand level at the origin is below the floor utilization level. In embodiments, and as described with respect to FIG. 4, content delivery network stratification module 110 determines whether the current demand level at origin 210 is below the floor utilization level.

If, at step 715, the system determines that the current demand level at the origin is below the optimal utilization level, then processing continues to step 720. In embodiments, and as described with respect to FIG. 4, if content delivery network stratification module 110 determines that the current demand level at origin 210 is below the floor utilization level, then processing continues to step 720. At step 720, the system removes stratification. In embodiments, and as described with respect to FIG. 4, content delivery network stratification module 110 removes nodes, for example edge 230, from the CDN to remove server resources and allow more requests to reach origin 210. Processing then continues to step 705 where the above process is repeated.

If, at step 715, the system determines that the current demand level at the origin is not below the optimal utilization level, then processing continues to step 725. In embodiments, and as described with respect to FIG. 4, if content delivery network stratification module 110 determines that the current demand level at origin 210 is not below the floor utilization level, then processing continues to step 725. By determining NO at step 705 and NO at step 715, the system determines that the current demand level at the origin is above the optimum utilization level. In embodiments, and as described with respect to FIG. 4, content delivery network stratification module 110 determines that the current demand level at origin 210 is above the optimum utilization level. Processing then continues to step 730, where the system adds stratification. In embodiments, and as described with respect to FIG. 4, content delivery network stratification module 110 adds nodes, for example edge 230, to the CDN to add server resources and allow fewer requests to reach origin 210. Processing then continues to step 705 where the above process is repeated.

Figure 8:
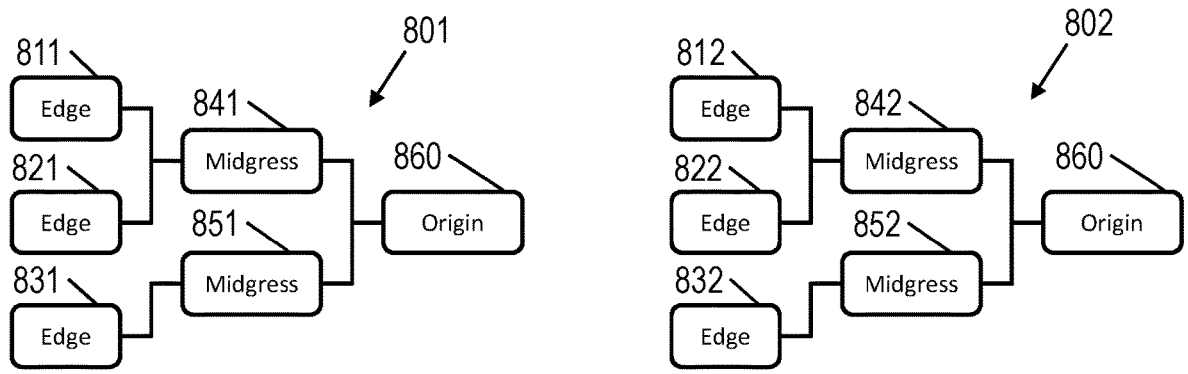
FIG. 8 shows a diagram of two exemplary CDNs prior to implementation of an exemplary method in accordance with aspects of the invention.
Figure 9:
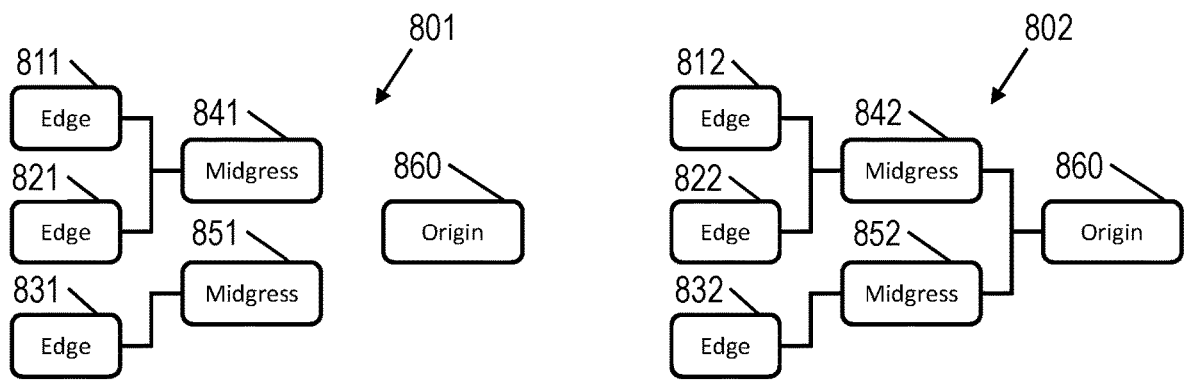
FIG. 9 shows a diagram of the CDNs shown in FIG. 8 after partial implementation of an exemplary method in accordance with aspects of the invention.
Figure 10:
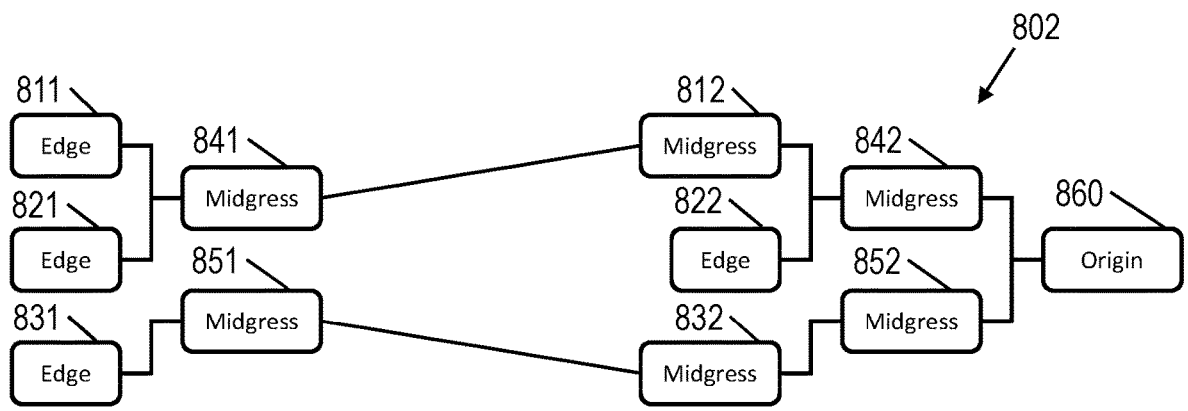
FIG. 10 shows a diagram of the CDNs shown in FIG. 8 after implementation of an exemplary method in accordance with aspects of the invention.

FIGS. 8-10 show an example of combining two CDNs in accordance with embodiments of the invention. FIG. 8 shows a first CDN 801 having edges 811, 821, and 831. Edges 811 and 821 are connected to a midgress 841, and edge 831 is connected to a midgress 851. Both midgresses 841 and 851 are connected to an origin 860. Similarly, a second CDN 802 has edges 812, 822, and 832. Edges 812 and 822 are connected to a midgress 842, and edge 832 is connected to a midgress 852. Both midgresses 842 and 852 are connected to the origin 860. Origin 860 shown in first CDN 801 and in second CDN 802 are the same origin.

If, for example, through the process shown in FIG. 7, content delivery network stratification module 110 determines that stratification should be added to second CDN 802 because a current demand level at origin 860 is above an optimal utilization level, then connections between nodes of first CDN 801 to origin 860 are removed and those nodes are connected directly to origin 860. As shown in FIG. 9, content delivery network stratification module 110 removes the connection between midgress 841 and origin 860 and removes the connection between midgress 851 and origin 860. Content delivery network stratification module 110 then, in this example, adds a connection between midgress 841 and edge 812 and adds a connection between midgress 851 and edge 832. In other examples, midgresses 814 and 851 are connected to other edges of CDN 802, other midgresses of CDN 802, or a combination thereof.

In the example shown in FIG. 10, edge 812 becomes a midgress of CDN 802 and edge 832 becomes a midgress of CDN 802. Because no new connection is made to edge 822, edge 822 remains an edge and does not become a midgress. The process shown in FIGS. 8-10 results in more stratification before origin 860, which reduces the hits on origin 860 by eliminating the hits on origin 860 from midgresses 841 and 851.

Figure 11:
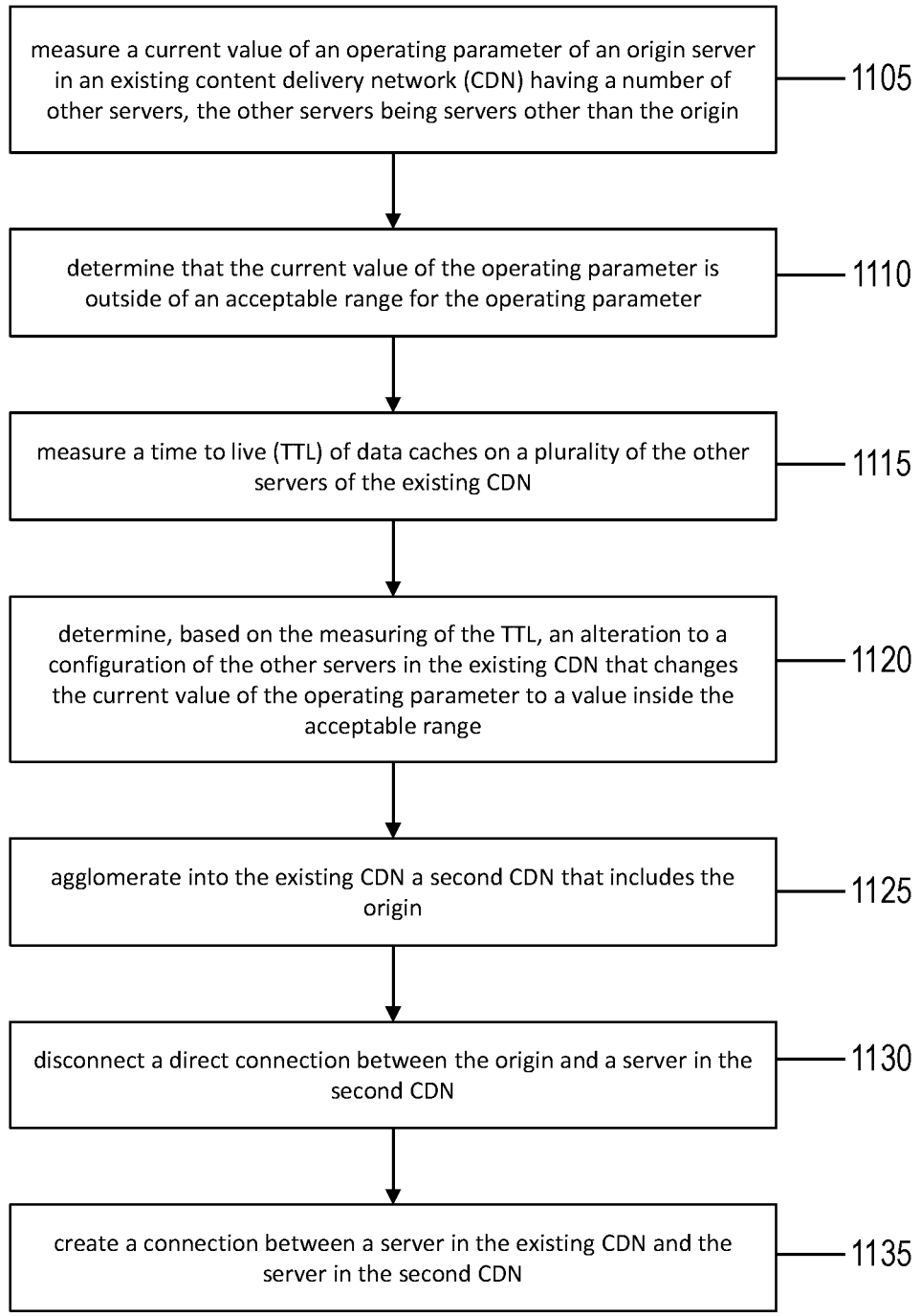
FIG. 11 shows a flowchart of an exemplary method in accordance with aspects of the invention.

FIG. 11 shows a flowchart of an exemplary method in accordance with aspects of the present invention. Steps of the method may be carried out in the environment of FIG. 4 and are described with reference to elements depicted in FIG. 4.

At step 1105, the system measures a current value of an operating parameter of an origin server in an existing content delivery network (CDN) having a number of other servers, the other servers being servers other than the origin. In embodiments, and as described with respect to FIGS. 4 and 8, content delivery network stratification module 110 measures a hit:cache ratio of origin 860 in CDN 802 that has edges 812, 922, 832 and midgresses 842, 852. In embodiments, content delivery network stratification module 110 analyzes historical traffic information for a group of CDNs that rely on the same origin.

At step 1110, the system determines that the current value of the operating parameter is outside of an acceptable range for the operating parameter. In embodiments, and as described with respect to FIGS. 4 and 8, content delivery network stratification module 110 determines that the current value of the hit:cache ratio (from step 1105) is outside of an acceptable range.

At step 1115, the system measures a time to live (TTL) of data caches on a plurality of the other servers of the existing CDN. In embodiments, and as described with respect to FIGS. 4 and 8, content delivery network stratification module 110 measures the TTL of data caches on edges 812, 922, 832 and midgresses 842, 852 of CDN 802.

At step 1120, the system determines, based on the measuring of the TTL, an alteration to a configuration of the other servers in the existing CDN that changes the current value of the operating parameter to a value inside the acceptable range. In embodiments, and as described with respect to FIGS. 4 and 8, content delivery network stratification module 110 determines an alteration to the configuration of edges 812, 922, 832 and midgresses 842, 852 of CDN 802 that changes the current value of the hit:cache ratio to a value inside the acceptable range. In embodiments, content delivery network stratification module 110 builds a model that predicts future changes in the origin data.

At step 1125, the system agglomerates into the existing CDN a second CDN that includes the origin. In embodiments, and as described with respect to FIGS. 4 and 8, content delivery network stratification module 110 agglomerates in CDN 802 CDN 801 that includes origin 860. In embodiments, content delivery network stratification module 110, in response to a predicted upcoming change to a specific data element of the origin data, dynamically modifies CDN parameters (e.g. TTL) for each CDN of the group prior to the predicted time of the predicted upcoming change.

At step 1130, the system disconnects a direct connection between the origin and a server in the second CDN. In embodiments, and as described with respect to FIGS. 4 and 9, content delivery network stratification module 110 disconnects the connection between origin 860 and midgress 841 in CDN 801. Similarly, content delivery network stratification module 110 disconnects the connection between origin 860 and midgress 851 in CDN 801.

At step 1135, the system creates a connection between a server in the existing CDN and the server in the second CDN. In embodiments, and as described with respect to FIGS. 4 and 10, content delivery network stratification module 110 creates a connection between edge 812 in CDN 802 and midgress 841 in CDN 801. Similarly, content delivery network stratification module 110 creates a connection between edge 832 in CDN 802 and midgress 851 in CDN 801.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
measuring, by a computer device, a current value of an operating parameter of an origin server in an existing content delivery network (CDN) having a number of other servers, the other servers being servers other than the origin server, wherein the origin server is connected to the existing CDN and a second CDN;
determining, by the computer device, that the current value of the operating parameter is outside of an acceptable range for the operating parameter;
measuring, by the computer device, a time to live (TTL) of data caches on a plurality of the other servers of the existing CDN;
determining, by the computer device and based on the measuring of the TTL, an alteration to a configuration of the other servers in the existing CDN that changes the current value of the operating parameter to a value inside the acceptable range;
disconnecting, by the computer device, a second CDN from the origin server, the second CDN having a plurality of servers separate from the other servers of the existing CDN; and
connecting, by the computer device, the second CDN to at least one of the other servers of the existing CDN, wherein the connecting reconnects the second CDN to the origin server through the existing CDN.

2. The computer-implemented method of claim 1, wherein the determining the alteration comprises determining, by the computer device, a particular location in the existing CDN to alter the configuration of the other servers in the existing CDN in order to change the current value of the operating parameter to a value inside the acceptable range,
wherein the determining the particular location is based on the measuring of the TTL.

3. The computer-implemented method of claim 1, wherein the disconnecting comprises disconnecting a direct connection between the origin server and one of the servers in the second CDN.

4. The computer-implemented method of claim 3, wherein the operating parameter of the origin server is a hit:cache ratio,
a hit is a request directly to the origin server, the request being a request for data,
a total number of data requests equals a sum of the hits and a number of data requests to the data caches of the data on the other servers, and
the hit:cache ratio is the ratio of the hits to the total number of data requests.

5. The computer-implemented method of claim 1, wherein the operating parameter of the origin server is a hit:cache ratio,
a hit is a request directly to the origin server, the request being a request for data,
a total number of data requests equals a sum of the hits and a number of data requests to the data caches of the data on the other servers, and
the hit:cache ratio is the ratio of the hits to the total number of data requests.

6. The computer-implemented method of claim 1, further comprising changing, by the computer device, the TTL of a first data cache of the data caches to change the operating parameter.

7. The computer-implemented method of claim 6, wherein the changing comprises manually changing, through the computer device, the TTL of the first data cache.

8. The computer-implemented method of claim 6, wherein the changing comprises the computer device automatically changing the TTL of the first data cache.

9. The computer-implemented method of claim 1, wherein the computer device includes software provided as a service in a cloud computing environment.

10. The computer-implemented method of claim 1, further comprising extracting, by the computer device, features of the data in the data caches.

11. The computer-implemented method of claim 10, further comprising representing, by the computer device, the features of the data as feature vectors.

12. The computer-implemented method of claim 11, further comprising determining, by the computer device, to perform the alteration, the determining to perform being based on processing the feature vectors.

13. The computer-implemented method of claim 12, wherein long short-term memory is used in making the determination to perform the alteration.

14. A computer program product, the computer program product comprising a computer readable storage medium having program instructions embodied therewith, the program instructions executable by a computing device to cause the computing device to:
measure a current value of an operating parameter of an origin server in an existing content delivery network (CDN) having a number of other servers, the other servers being servers other than the origin server, wherein the origin server is connected to the existing CDN and a second CDN;
determine that the current value of the operating parameter is outside of an acceptable range for the operating parameter;
measure a time to live (TTL) of data caches on a plurality of the other servers of the existing CDN; and
determine, based on the measuring of the TTL, that a second CDN is to be agglomerated into the existing CDN to change the current value of the operating parameter to a value inside the acceptable range,
wherein the second CDN includes the origin server and a plurality of servers separate from the other servers of the existing CDN, and
the agglomeration comprises disconnecting the plurality of servers of the second CDN from the origin server, and
connecting the plurality of servers of the second CDN to at least one of the other servers of the existing CDN, wherein the connecting reconnects the second CDN to the origin server through the existing CDN.

15. The computer program product of claim 14, wherein the disconnecting comprises disconnecting a direct connection between the origin server and one of the servers in the second CDN.

16. The computer program product of claim 14, wherein the operating parameter of the origin server is a hit:cache ratio,
a hit is a request directly to the origin server, the request being a request for data,
a total number of data requests equals a sum of the hits and a number of data requests to the data caches of the data on the other servers, and
the hit:cache ratio is the ratio of the hits to the total number of data requests.

17. A system comprising:
a processor, a computer readable memory, and a computer readable storage medium;
program instructions to determine that a current value of an operating parameter of an origin server in an existing content delivery network (CDN) is outside of an acceptable range for the operating parameter, the existing CDN having a number of other servers, the other servers being servers other than the origin server, wherein the origin server is connected to the existing CDN and a second CDN;
program instructions to determine, based on a time to live (TTL) of data caches on a plurality of the other servers of the existing CDN, an alteration to a configuration of the other servers in the existing CDN that changes the current value of the operating parameter to a value inside the acceptable range;
program instructions to disconnect a second CDN from the origin server, the second CDN having a plurality of servers separate from the other servers of the existing CDN; and
program instructions to connect the second CDN to at least one of the other servers of the existing CDN, wherein the connecting reconnects the second CDN to the origin server through the existing CDN, and
the program instructions are stored on the computer readable storage medium for execution by the processor via the computer readable memory.

18. The system of claim 17, wherein the operating parameter is a hit:cache ratio of the origin server.

19. The system of claim 17, wherein the disconnecting comprises disconnecting a direct connection between the origin server and one of the servers in the second CDN.

* * * * *